June 19, 1962 S. SIMON ETAL 3,039,382
APPARATUS FOR USE IN THE PRODUCTION OF SHAPED MEAT PRODUCTS
Filed Dec. 9, 1958 2 Sheets-Sheet 1

INVENTORS
SELWYN SIMON
MARVIN W. TOEPPER
HOWARD E. KASTING

BY *Ray R. [signature]*
ATTORNEY

June 19, 1962 S. SIMON ETAL 3,039,382
APPARATUS FOR USE IN THE PRODUCTION OF SHAPED MEAT PRODUCTS
Filed Dec. 9, 1958 2 Sheets-Sheet 2

INVENTORS
SELWYN SIMON
MARVIN W. TOEPPER
HOWARD E. KASTING

BY
ATTORNEY

United States Patent Office 3,039,382
Patented June 19, 1962

3,039,382
APPARATUS FOR USE IN THE PRODUCTION
OF SHAPED MEAT PRODUCTS
Selwyn Simon, Northbrook, Marvin W. Toepper, Brookfield, and Howard E. Kasting, Park Forest, Ill., assignors to Union Carbide Corporation, a corporation of New York
Filed Dec. 9, 1958, Ser. No. 779,193
3 Claims. (Cl. 100—219)

This invention relates to an improved end plate assembly for a fenestrate meat product shaping and cooking cage. More particularly, it relates to an end plate assembly and associated pressure applying means having inherent safety features.

The instant invention has particular utility in preparing shaped meat products and particularly in the process disclosed in the application of M. W. Toepper et al., Serial No. 779,238 filed concurrently herewith entitled, "Method and Apparatus for Preparing Shaped Meat Products."

The above-identified application discloses a novel process and apparatus for obtaining a shaped meat product having a high density and desirably shaped ends to facilitate automatic slicing and packaging with a minimum of waste. Basically the process comprises two novel features which produce the desired end product. Firstly, the meat product is extruded into a casing interior of a rigid fenestrate shaping cage which has certain advantages more fully described in said copending application. Secondly, the encaged meat product is compacted and shaped in a press which applies axial pressure to both ends thereof through two slidable end plate assemblies having resilient energy storage means affixed thereto and which can be locked in place to maintain pressure on both ends of the encaged meat product during subsequent smoking and/or cooking steps. The specific advantages accruing from this arrangement are also set forth in greater detail in said copending application.

In the above process, difficulty has been encountered in applying the axial compacting pressure to the two ends of the encaged meat product. The type of compacting press normally used to compress the resilient energy storage means comprises a movable ram which contacts one of the above-mentioned end plate assemblies and a stationary member which contacts the other end plate assembly, the encaged meat product being placed therebetween. In the instance of a helical spring being the resilient energy storage means, it occasionally causes the fenestrate cage to be forcefully ejected from the press if the ram compacting pressure is applied eccentrically of the said resilient means. When the pressure is applied eccentrically to such end plates the resilient means are partially compressed, but due to the eccentric loading they are caused to bend or compress on a line other than through the axis of the cage assembly. This causes a sidewise force tending to force the cage away from said axis. For a short time the friction between the mating portions on the press and the resilient means maintains the cage assembly in place, but as the resilient means is further compressed, this sidewise pressure becomes greater and at some point will result in the violent ejection of the cage from the press when the resultant sidewise pressure stored in the resilient means overcomes the restraining friction.

The encaged meat product must be free to move axially within the fenestrate cage if the maximum advantage is to be realized from the application of axial compacting pressure to both ends of the meat product. Hence it is not convenient to restrain the cage itself within the press since any sort of clamping tends to interfere with the freedom of axial movement of the cage and thus with the compacting efficiency of the process. Also clamping and unclamping would require too many time consuming operations in the processing cycle. It has thus been found necessary to develop a satisfactory safety means for preventing a fenestrate shaping cage utilizing end plates with resilient energy storage means thereon as used in the process referred to herein from being forcibly and violently ejected from the press whenever pressure is applied to the end plates through the resilient means eccentrically thereof.

It is the primary object of this invention to provide an apparatus which will prevent ejection of the fenestrate cage from the compacting press due to eccentric loading.

Other objects and advantages will be apparent from the description and drawings in which.

According to the invention there is provided an improvement in an apparatus for producing a shaped meat product, said apparatus including a shaping press having two pressure members thereon for applying axial pressure to both ends of an encaged meat product, a fenestrate shaping cage adapted to fit in said press, and two end plate assemblies having resilient pressure storage members affixed thereto and adapted to fit into and be axially slideable in said fenestrate cage. The improvement comprises means on the resilient members which engage further means on the two pressure applying members for preventing the two means from becoming disengaged due to any misalignment of the fenestrate cage, end plate assemblies and the resultant members affixed thereon; with the two pressure applying members of the press when pressure is applied.

Specifically, the type of disengagement which is prevented by the instant invention is that wherein the resilient means pivots about the pressure applying means on the press at the point of contact as pressure is applied until the two members disengage themselves. As stated previously if the resilient means are sufficiently compressed before the disengagement occurs the movement may be quite violent constituting a real safety hazard to operating personnel.

In the preferred embodiment of the invention a pintle receiving plate is fastened to the end of the resilient means as by welding. This plate has a hole in the center thereof which is along the axis of the resilient means, the end plate assembly and the rigid, fenestrate cage when in place therein. Both the movable and stationary pressure applying means have mating members thereon comprising a pintle portion which fits in the hole within the pintle receiving plate and a shoulder portion which abuts the pintle receiving plate adjacent said hole and is the means for applying the pressure to said plate. The relative size of the hole and the mating pintle is such that the plate cannot be pivoted out of engagement with the pintle as long as the plate is touching the shoulder portion. The forward portion of the pintle is preferably cone shaped or tapered to facilitate rapid engagement and centering with the hole.

While a preferred form of end plate assembly hereinafter referred to as such is shown and will be described with reference to the figures, it is to be understood that other forms of resilient pressure storage means could be interposed between the pressure applying plate and pintle receiving plate within the spirit and scope of the invention. Such possibilities include a leaf spring, an elastic mass as a cylinder of rubber, or a fluid filled elastic container.

Figure 1:
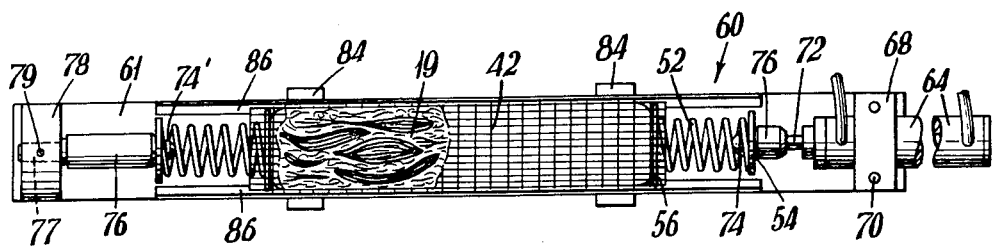
FIG. 1 is a plan view of a compacting press with an encaged meat product in place thereon, and showing at each end of the fenestrate cage an end plate assembly having improved safety features.
Figure 2:
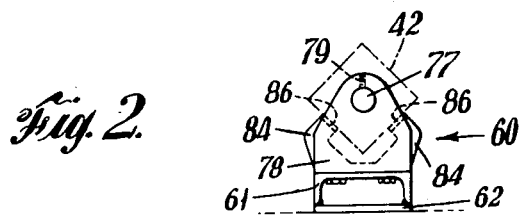
FIG. 2 is an end view of the apparatus shown in FIG. 1.
Figure 3:
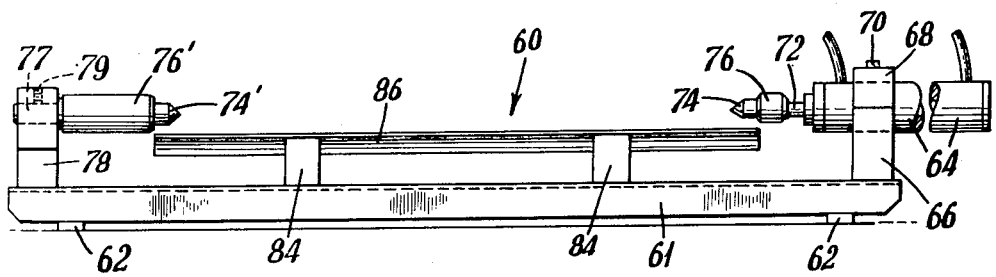
FIG. 3 is a side elevation of one embodiment of a meat mold press illustrating the pintles for engagement with the end plate assemblies.

Referring now to FIGURES 1, 2 and 3 the meat mold press 60 is comprised of base 61, such as structural steel channel shape about 5 ft. long and provided on the flanges thereof with a plurality of mounting plates 62 for fastening to a convenient work surface. An air cylinder 64, such as one having 2½" diameter x 16" stroke is horizontally disposed in a vertical clamping post 66 fastened to base 61. Clamping post 66 is machined to grip air cylinder 64 and through adjustment of clamping cap 68 engaged to post 66 by appropriate screw fastenings 70, permits axial adjustment of cylinder 64. The free end of air cylinder piston rod 72 is provided with shoulder portion 76 which also serves as a pilot portion for retaining member 80 and cone-shaped ram pintle portion 74.

Vertical pedestal 78 is fastened to base 61 at the machine end opposite air cylinder 64. Pedestal 78 is bored to receive shouldered shaft 77 which is affixed as a cantilever therein by set screw 79. The shaft 77 is parallel to and centered on the axis of air cylinder 64. Shaft 77 is provided with shoulder portion 76' and pintle portion 74'.

Horizontal support for wire cage 42, is provided on the press by guide rail 86 fastened to and supported from base 61 by brackets 84, to position the cage at 45° to the horizontal and on the center line of air cylinder 64 and shaft 77.

While the press is preferably horizontally positioned, if desired it could be mounted in a vertical position.

Figure 4:
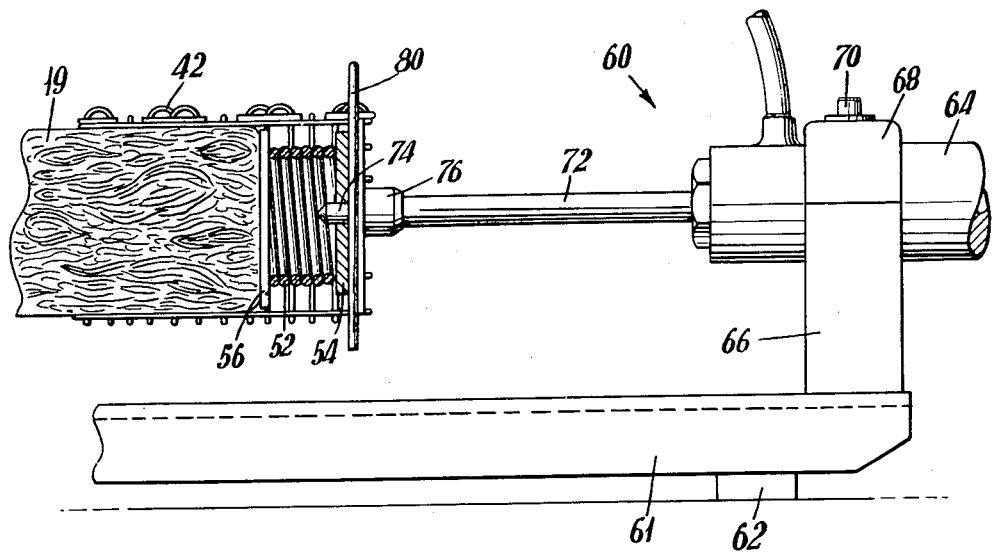
FIG. 4 is a side elevational view partly in section of a spring end plate with a retaining pin locking same in position within the cage after compression of the spring.

FIG. 4 shows the press 60 with the meat mass confined under pressure within the casing 19 interior of cage 42. Springs 52 of end plate assemblies 50 are fully compressed. Retaining members 80 are in place, guided through appropriately chosen bars of cage 42 by shoulder and pilot portions 76, 76' of press 60, to abut and retain in compressed position plate 54.

The extension of shaft 77 cantilevered from pedestal 78 permits pintle 74' to enter the interior of the end of cage 42 without constraining the cage axially against the press. Guide rails 86 merely position the cage on the center line of press 60 and thus under pressure, the cage is substantially free to move axially, thereby permitting the meat mass to be pressurized equally at each end.

Figure 5:
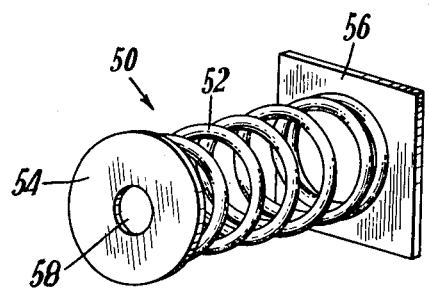
FIG. 5 is a perspective of a preferred embodiment of an end plate having a resilient means affixed thereto illustrating the safety feature and FIG. 6 is a perspective of a preferred embodiment of a locking pin for maintaining the resilient means in a compressed state.

Referring now to FIGURE 5, spring end plate assembly 50 is made of a stainless steel coil spring 52 intermediate of and fastened to stainless steel square pressure applying plate 56 such as 3⅞" x 3⅞" x 12 gauge and stainless steel round pintle receiving plate 54 such as 3¾" dia. x 12 gauge provided with central hole 58, a loose fit for pintles 74, 74'.

Figure 6:
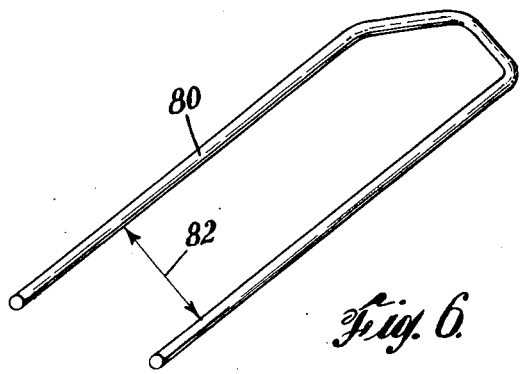

Referring now to FIGURE 6, retaining member 80 is made of ¼" diameter stainless steel rod bent to a U-shape with an inside span 82 made ⅛" wider than shoulders 76, 76' diameter.

As may be seen from FIG. 4, retaining member 80 is of sufficient length to pass entirely through the cage to lock the spring end plate assembly 50 in place.

From the above description with reference to the drawings it may be seen that the instant invention accomplishes two things. Firstly it guides the cage, meat product and end plate assembly into substantial alignment with the press by the action of the centered holes 58 in the pintle receiving plate 54 with the pintles 74 and 74'. And secondly it prevents disengagement of the above assembly even if not aligned perfectly with the press since it is physically impossible for the interfitting pintles 74, 74' and holes 58 in pintle receiving plates 54 to become disengaged unless a force sufficient to tear the metal of plates 54 were applied which is not likely under any normal operating condition.

There has thus been described a novel spring end plate assembly and cooperating apparatus for use in the production of shaped meat products having certain inherent safety features and production advantages. While a preferred embodiment has been illustrated it is to be understood that certain modifications, changes, and substitutions could be made within the scope of the invention by a person skilled in the art.

What is claimed is:

1. An apparatus for producing a shaped meat product including a shaping press having opposed pressure members thereon for applying axial pressure to opposite ends of an encaged meat product, one of said members being movable and means for moving said movable member, each pressure member having attached thereto a pintle having a smooth surface and provided with a shoulder portion displaced from the pintle end, a fenestrate meat shaping cage adapted to fit in said press between said pressure members, an end plate assembly for each end of said cage and axially slidable within said cage, said assembly comprising a pair of spaced plates having a compressible helical spring affixed thereto and spaced apart thereby, one of said plates having a pintle receiving hole therethrough along the line of the longitudinal axis of said spring defined by a smooth peripheral surface and into which the pintle readily slidably fits with its shoulder portion abutting the one plate adjacent said hole for preventing said pintle receiving plate and pintle from becoming disengaged due to non-alignment of the fenestrate cage, the end plate assemblies and the helical spring thereon with the two pressure applying members of the press, and a retaining pin for each end plate assembly, said pin coacting with the end plate assembly to lock each said assembly in compressed relationship against the encaged meat product and maintain said relationship after removal of the cage from the shaping press.

2. An apparatus for producing a shaped meat product including a shaping press having two members thereon for applying axial pressure to both ends of an encaged meat product, one of said members being movable and means for moving said movable member, a fenestrate shaping cage adapted to fit in said press, two end pressure applying plates adapted to fit into and be axially slidable in said fenestrate cage and wherein each end pressure applying plate has a resilient pressure storage member fixed thereto and a pintle receiving plate also fixed to said storage member and having a hole centrally located therein defined by a smooth peripheral surface, each of said pressure applying members for the press being provided with a pintle having a smooth surface and adapted to readily fit within the hole of the mating pintle receiving plate and a shoulder displaced from an end of said pintle adapted to abut the pintle receiving plate adjacent the hole therein, the relative size of the hole in each pintle receiving plate being such that said pintle receiving plate has a loose fit with respect to the mating pintle for preventing said pintle receiving plate and pintle from becoming disengaged due to non-alignment of the fenestrate cage, the end plate assemblies and the resilient members thereon with the two pressure applying members of the press when pressure is applied as long as the pintle receiving plate is contacting the pintle shoulder.

3. An apparatus as set forth in claim 2 wherein the resilient members are helical springs fixedly attached to the pressure applying plates on one end and fixedly attached to the pintle receiving plates on the other end.

References Cited in the file of this patent

UNITED STATES PATENTS

| | | |
|---|---|---|
| 1,165,223 | Butz | Dec. 21, 1915 |
| 1,168,330 | Reinhold | Jan. 18, 1916 |
| 1,344,261 | Chermak | June 22, 1920 |
| 2,101,755 | Rosenstone et al. | Dec. 7, 1937 |
| 2,425,727 | Butz | Aug. 19, 1947 |
| 2,912,924 | Dahl et al. | Nov. 17, 1959 |